United States Patent [19]

Bucha

[11] 3,995,920
[45] Dec. 7, 1976

[54] ROLLER BEARING

[76] Inventor: Louis J. Bucha, 2800 Bernice Road, Lansing, Ill. 60438

[22] Filed: Aug. 6, 1973

[21] Appl. No.: 386,081

[52] U.S. Cl. .................. 308/216; 29/122; 193/37; 308/214; 72/241
[51] Int. Cl.² ................ F16C 33/00; B21B 7/02
[58] Field of Search ............ 308/214, 20, 18, 191, 308/203, 26, 202, 203, 206, 215, 216; 51/290, 291; 29/122, 125; 301/5.7, 163; 72/241, 163, 241; 193/37

[56] References Cited
UNITED STATES PATENTS

| | | | |
|---|---|---|---|
| 1,647,843 | 11/1927 | Smith | 29/122 |
| 2,071,628 | 2/1937 | Hudcock | 308/194 |
| 2,659,637 | 11/1953 | Barr | 308/207 |
| 3,288,542 | 11/1966 | Cowles et al. | 308/216 |
| 3,602,150 | 8/1971 | Frost | 308/187 |

*Primary Examiner*—Philip Goodman
*Assistant Examiner*—Richard A. Bertsch
*Attorney, Agent, or Firm*—Walter Leuca

[57] ABSTRACT

An improved surface for an outer race member of a roller bearing by providing an annular curved surface between the circumferential crown surface and the annular corner radius surface. This improved surface has one end thereof tangent to the crown surface and the other end thereof tangent to the corner radius surface. The center of the radii of the curve increments therebetween being on a line connecting the centers of the crown radius and the corner radius and the radii uniformly diminish from the crown radius to the corner radius.

7 Claims, 6 Drawing Figures

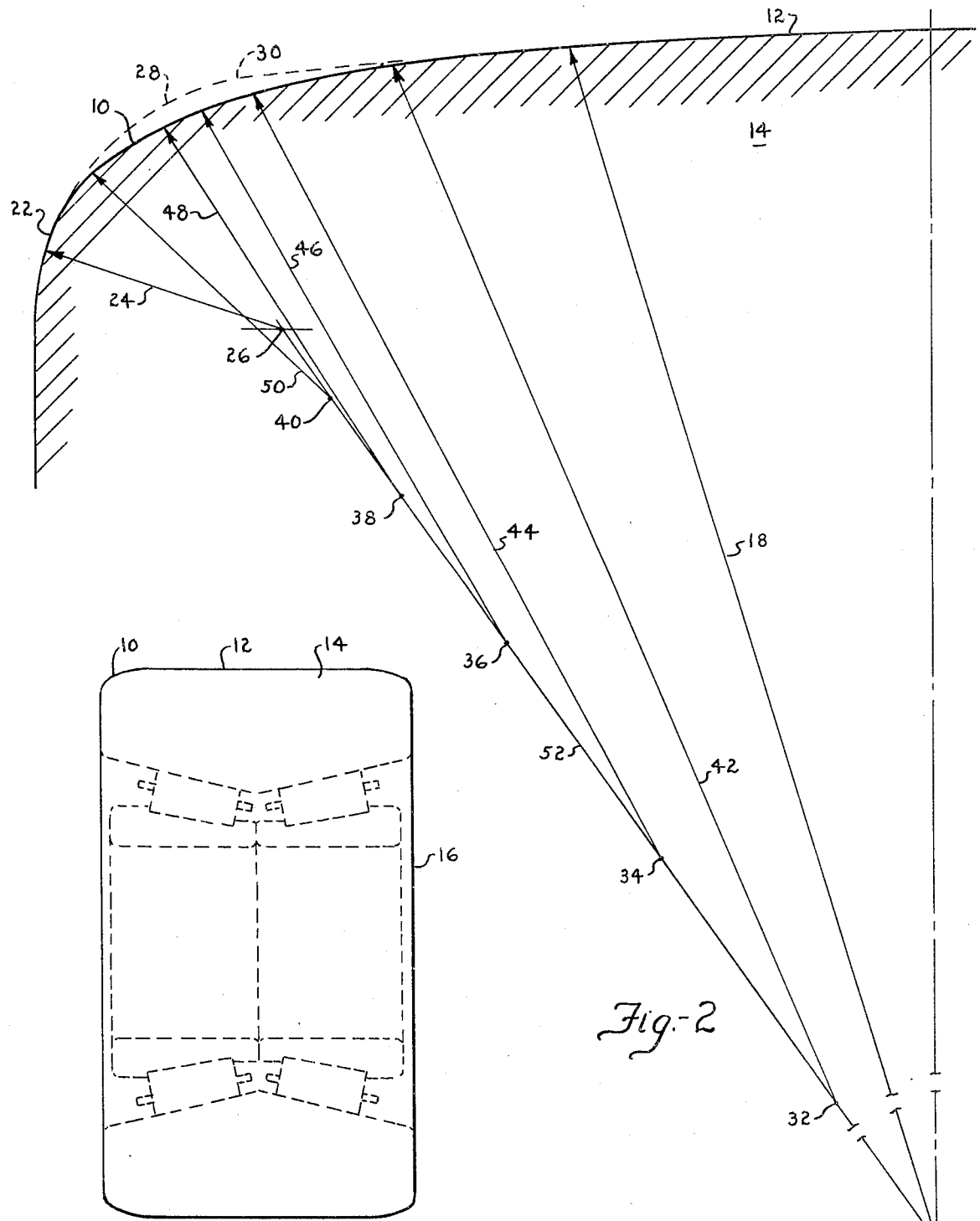

ROLLER BEARING

BACKGROUND OF THE INVENTION

1. Field of the Invention

This invention relates to roller bearings and more particularly to improvements in the outer race member of roller bearings.

2. Description of the Prior Art

My invention contemplates the use of the outer race member of roller bearings as backup rollers against straightening rolls by which means sheet strip is straightened as one of the last operations in manufacturing steel sheet. Briefly stated, steel sheet prior to being coiled or sheared and packed for shipment to consumers, passes through a roll mill having straightening rolls which are relatively long and small diameter rolls. This operation serves to eliminate unevenness of steel sheet. Straightening rolls are precision ground so that the finished product will have a smooth surface and even thickness throughout. To accomplish this operation, the straightening rolls between which the product passes is provided with backup rollers laterally spaced apart along the length of the straightening rollers. These backup rollers are the outer race members of roller bearings, the inner race members of which are mounted on shafts which are adjustably movable so that the outer race member of the roller bearings mounted thereon may be made to bear against the straightening rolls with the force necessary to support the straightening rolls and thereby prevent flexing thereof as the rolls work the product to a finish surface as it passes therethrough.

The difficulties experienced in the prior practice resulted from the use of the outer race of the roller bearings as an area of applied force to maintain the straightening rollers of the roller mill axially rigid as it works the steel sheet. The surface contour across the outer race member of conventional roller bearings is such that after normal wear, some misalignment may occur causing the longitudinal line contact of the outer race member with the straightening roll, to shift and localize as a point contact adjacent the end or corner of the outer race member. The outer race roller of conventional bearings are provided with a substantially flat surface from end face to end face, that is, having a 1/1000th inch crown, which means that the crown radius is 1000 inches. For example, across a 2 inch wide roller bearing having a diameter of 3.5 inches, and a ⅛th inch corner radius provided between the end face of the outer race member and the roller surface, the point at which the ⅛th inch corner radius meets the 1000 inch radius roll surface of the outer race member, a definite and perceptible line or ridge is developed. This line is sufficiently pronounced, that the force exerted by the roller surface of the outer race member against the straightening roll, a wear line is worked circumferentially into the straightening roll and then impressed into the steel sheet passing through the roll. This necessitates stopping the straightening operation upon the appearance of the marked surface of the steel sheet to replace the straightening roll with new rolls or reground rolls, and also replace the worn bearings.

SUMMARY OF THE INVENTION

Accordingly, I provide an outer race member for roller bearings used as backup rollers for straightening rolls with an improved contoured surface which does not have a line of demarcation between the large curvature radius of the roller surface and the small radius forming the corner between the roll surface and the end face of the race member. I provide a curvature therebetween to blend the large radius curvature and the small curvature of the corner.

Other objects and advantages will become more apparent upon a more closer study of the following description, especially when taken with reference to the accompanying drawing which illustrates a preferred embodiment of my invention.

BRIEF DESCRIPTION OF THE DRAWINGS

FIG. 1 is an elevation of the outer race of a conventional roller bearing embodying my invention;

FIG. 2 is an enlarged cross sectioned view of the outer race surface showing diagramatically the curve of my invention between the crown radius curve and the corner radius curve;

DESCRIPTION OF THE PREFERRED EMBODIMENT

Referring now more particularly to the drawings, numeral 10 designates generally the improved roll surface of the outer race of a bearing embodying my invention. Though the roller bearing may be manufacturing embodying the principals of my invention, I contemplate treating conventional bearings so that the resultant improvements will embody my invention.

Therefore, my invention will be described in terms of reshaping the roll surface of the outer race of a conventional bearing.

Figure 6:
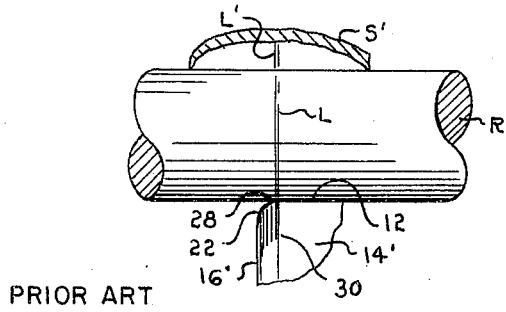
FIG. 6 is a view similar to FIG. 5 with a prior art outer race of a conventional roller bearing showing the prior art indentation impressed in the steel sheet by a marked roll.

With reference to FIG. 2, numeral 12 designates the crown surface of the outer race member 14 of roller bearing 16. The cross sectional line contour of the crown surface 12 has a radius 18, the center point of which is at 20, being the 1000 inch radius referred to above in the example. The cross sectional line contour of corner radius 22 has a radius 24 the center point of which is at 26, being the ⅛th inch radius referred to above in the example. Line contour 28 in FIG. 2 is dotted to represent the prior art surface of the outer race member 14' of the prior art bearing 16', which includes the circumferential line 30 shown as a solid light line in FIG. 6 produced by the intersection of annular crown surface 12 and annular corner radius 24. The circumferential line 30 as stated above is sufficiently pronounced to wear a line L circumferentially into the straightening roll R which is impressed as at L' into steel sheet S' passing through rolls R.

I produce surface 10 of my invention by grinding the prior art surface 28. The grinding operation is initiated on the crown surface 12 spaced from intersection 30 of the two radii surfaces. The tangential direction of the grinding operation is initiated at a tangent to the crown surface 12 and progresses with a diminishing radii curvature until it is tangent to the corner radius 24.

Figure 5:
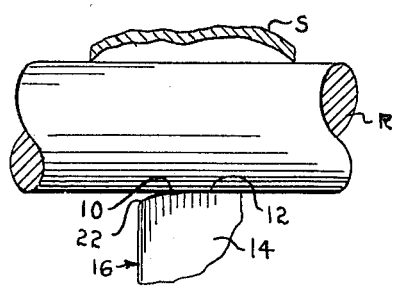
FIG. 5 is an enlarged detail of the outer race of my bearing, straightening roll and steel sheet shown in fragment.
Figure 3:
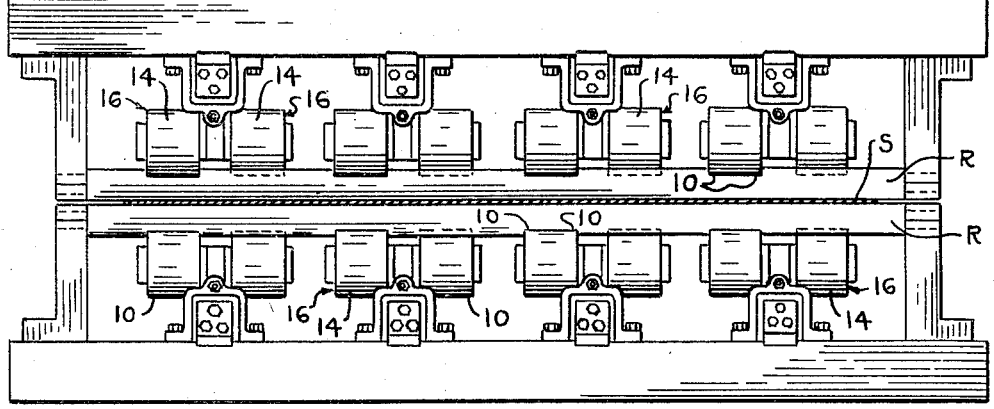
FIG. 3 is a front view of the straightening roll stand provided with improved roller bearings of my invention.
Figure 4:
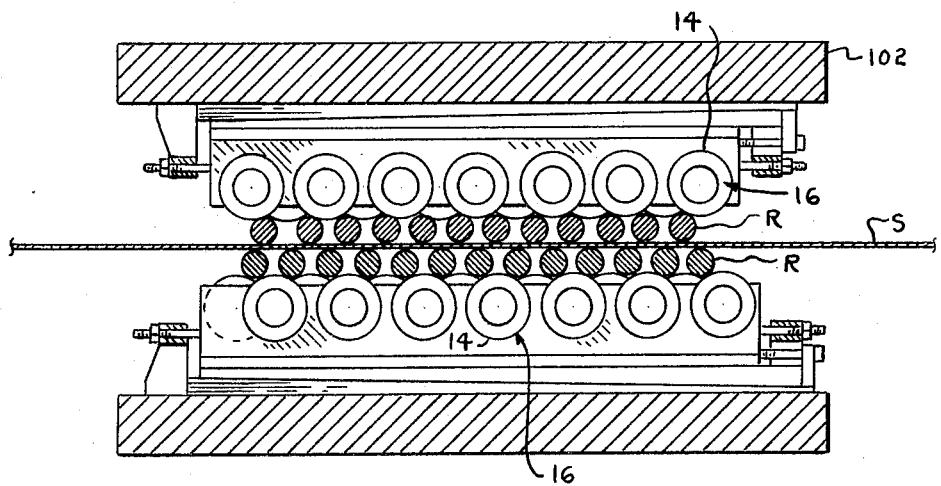
FIG. 4 is a sectional end elevation of the straightening roll stand taken along lines 4—4 of FIG. 3.

I determine the curvature 10 of my invention by locating the diagramatic centers 32, 34, 36, 38 and 40 of radii 42, 44, 46, 48 and 50, respectively along a line 52 which diagramatically connects center 20 of radius 18 and center 26 of radius 24. Each increment of the curve 10 increases in curvature from the crown surface 12 to the corner radius surface 22 in proportion to its radii which diminishes uniformly from radius 18 to radius 24. I have found that by thus restructuring the surface of the outer race by grinding the surface between the corner radius and the crown radius circumferentially therearound so that the annular curved surface formed therebetween has one end tangent to the crown radius surface and the other end tangent to the corner radius surface, and the curvature of the curved surface is made to increase uniformly as it becomes tangent to the corner radius surface. The improved surface of the outer race 14 may serve as backup rollers without marking or indenting straightening rollers R against which it presses and consequently steel sheet S rolled therebetween will not be marred. The absence of a line such as L' of FIG. 6 in steel sheet S in FIG. 5 illustrates the result of the improved bearing 16 of my invention even though the wear and misalignment conditions of improved bearing 16 is similar to the prior art bearing 16' illustrated in FIG. 6.

I claim:

1. An outer race of a roller bearing comprising: an annular crown radius surface; an annular corner radius surface; and an annular curved surface therebetween having radii which uniformly diminish from the center of said crown radius to the center of said corner radius, one end of said curved surface being tangent to said annular crown radius surface and the other end thereof being tangent to said corner radius surface.

2. A method of restructuring the outer race of a roller bearing wherein the annular crown radius surface meets the annular corner radius surface circumferentially therearound comprising the steps of: grinding the crown radius surface in a direction tangential thereto circumferentially therearound; and changing the direction of grinding adjacent the juncture of the crown radius surface and the corner radius surface until the grinding direction is tangent to the corner radius surface.

3. The method of claim 2 wherein said change of direction of grinding adjacent said juncture of the crown radius surface and said corner radius surface is uniform.

4. An outer race of a roller bearing comprising: An annular crown surface having a large radius; an annular corner surface having a small radius; an annular curved surface therebetween, the radii of said annular curved surface being variable and characterized by having their centers on a line connecting the center of said crown radius and the center of said corner radius.

5. The outer race of the roller bearing of claim 4 wherein said annular curved surface is further characterized as having radii which uniformly diminish from the center of said crown radius to the center of said corner radius.

6. An outer race of a roller bearing comprising: An annular crown surface having a large radius, and an annular corner surface having a small radius bearing an approximate ratio of 1 to 8000 to said large radius; an annular curved surface therebetween, the radii of said annular curved surface being variable and characterized by having their centers on a line connecting the center of said crown radius and the center of said corner radius.

7. The outer race of the roller bearing of claim 6 wherein said annular curved surface is further characterized as having radii which uniformly diminish from the center of said crown radius to the center of said corner radius.

* * * * *